United States Patent
Milne

(10) Patent No.: US 10,607,268 B2
(45) Date of Patent: Mar. 31, 2020

(54) SOCIAL NETWORK TRANSACTION PROCESSING SYSTEM

(71) Applicant: Dwolla, Inc., San Francisco, CA (US)

(72) Inventor: Benjamin P. Milne, Newton, IA (US)

(73) Assignee: Dwolla, Inc., Des Moines, IA (US)

( * ) Notice: Subject to any disclaimer, the term of this patent is extended or adjusted under 35 U.S.C. 154(b) by 346 days.

(21) Appl. No.: 15/728,015

(22) Filed: Oct. 9, 2017

(65) Prior Publication Data
US 2018/0033063 A1 Feb. 1, 2018

Related U.S. Application Data

(63) Continuation of application No. 12/931,141, filed on Jan. 25, 2011, now Pat. No. 9,792,636.

(51) Int. Cl.
| | | |
|---|---|---|
| *G06Q 40/00* | (2012.01) | |
| *G06Q 30/06* | (2012.01) | |
| *G06F 16/955* | (2019.01) | |
| *G06Q 10/10* | (2012.01) | |
| *G06Q 20/40* | (2012.01) | |
| *G06Q 40/06* | (2012.01) | |
| *G06Q 50/00* | (2012.01) | |

(52) U.S. Cl.
CPC ..... *G06Q 30/0617* (2013.01); *G06F 16/9558* (2019.01); *G06Q 10/101* (2013.01); *G06Q 20/40* (2013.01); *G06Q 40/06* (2013.01); *G06Q 50/01* (2013.01)

(58) Field of Classification Search
USPC .......................................................... 705/44
See application file for complete search history.

(56) References Cited

U.S. PATENT DOCUMENTS

| | | | |
|---|---|---|---|
| 7,644,037 B1 | 1/2010 | Ostrovsky | |
| 8,050,997 B1 | 11/2011 | Nosek et al. | |
| 8,224,727 B2 * | 7/2012 | Hirson .................. | G06Q 20/10 705/35 |
| 8,326,770 B1 * | 12/2012 | Weisman ............... | G06Q 50/01 705/319 |

(Continued)

FOREIGN PATENT DOCUMENTS

| | | |
|---|---|---|
| WO | WO0161662 A2 | 8/2001 |
| WO | WO 2006/000021 | 1/2006 |

OTHER PUBLICATIONS

"Mobile Payment may be the death of the wallet" Sep. 28, 2010 (Year: 2010).*

(Continued)

*Primary Examiner* — Bruce I Ebersman
(74) *Attorney, Agent, or Firm* — Hickman Palermo Becker Bingham LLP

(57) ABSTRACT

A system for transferring funds using social network connections. The system sends application programming interface (API) requests to social networks to obtain "friend" information and create accounts into which funds are deposited and which may be retrieved by recipients via hyperlinks in messages provided through social networks. The system may also be used to request funds from social network friends. The system provides benefactor friends fund requests in the form of social network messages, which allow the benefactors to access the system and provide funds to a user via hyperlinks in the messages.

13 Claims, 15 Drawing Sheets

(56) References Cited

U.S. PATENT DOCUMENTS

| | | | |
|---|---|---|---|
| 8,355,955 | B1 | 1/2013 | Mirchandani |
| 8,396,772 | B2 | 3/2013 | Abifaker |
| 8,396,808 | B2 | 3/2013 | Greenspan |
| 8,600,830 | B2 * | 12/2013 | Hoffberg ............ G06Q 30/0207 705/26.3 |
| 9,928,490 | B1 | 3/2018 | Vancini |
| 2005/0216300 | A1 | 9/2005 | Appleman et al. |
| 2007/0255652 | A1 | 11/2007 | Tumminaro et al. |
| 2008/0070593 | A1 | 3/2008 | Altman et al. |
| 2009/0150254 | A1 | 6/2009 | Dickelman |
| 2009/0182664 | A1 | 7/2009 | Trombley |
| 2010/0017325 | A1 | 1/2010 | Scherpa et al. |
| 2010/0132049 | A1 | 5/2010 | Vernal et al. |
| 2010/0250687 | A1 | 9/2010 | Smith |
| 2010/0306099 | A1 | 12/2010 | Hirson |
| 2011/0288978 | A1 | 11/2011 | Abifaker |
| 2012/0089461 | A1 | 4/2012 | Greenspan |
| 2015/0254746 | A1 | 9/2015 | Milne |

OTHER PUBLICATIONS

Milne, U.S. Appl. No. 14/686,207, filed Apr. 10, 2015, Interview Summary, dated Nov. 27, 2017.
Venmo's Simply Loaded Promise: Pay your Friends, http://gigaom.com/2010/0216/venmos-simple-loaded-pemise, dated 2010, 5 pages.
Hachman, M., "Mobilepay: Your Phone is Your Credit Card" dated Sep. 28, 2010, retrieved from the internet on Oct. 25, 2013, pcmag.com/article2/0,2817,2369877,00.asp, 1 page.
Gannes, Liz, "Twitpay Sells for $100K, Will be Used for Charity Fundraising", http://gigaom.com dated Feb. 19, 2010, 3 pages.
Milne, U.S. Appl. No. 14/684,207, filed Apr. 10, 2015, Final Office Action, dated Jan. 23, 2018.
Milne, U.S. Appl. No. 14/684,207, filed Apr. 10, 2015, Interview Summary, dated Mar. 16, 2018.
Milne, U.S. Appl. No. 14/684,207, filed Apr. 10, 2015, Notice of Allowance, dated May 30, 2018.
U.S. Appl. No. 13/450,647, filed Apr. 19, 2012, Final Office Action, dated Oct. 31, 2012.
U.S. Appl. No. 13/450,647, filed Apr. 19, 2012, Office Action, dated Jul. 11, 2014.
U.S. Appl. No. 13/450,647, filed Apr. 19, 2012, Office Action, dated Jun. 27, 2012.
U.S. Appl. No. 13/450,647, filed Apr. 19, 2012, Interview Summary, dated Mar. 9, 2015.
U.S. Appl. No. 13/450,647, filed Apr. 19, 2012, Final Office Action, dated Dec. 10, 2014.
U.S. Appl. No. 13/450,647, filed Apr. 19, 2012, Advisory Action, dated Mar. 17, 2015.
U.S. Appl. No. 12/931,141, filed Jan. 25, 2011, Office Action, dated Apr. 29, 2015.
U.S. Appl. No. 12/931,141, filed Jan. 25, 2011, Notice of Allowance, dated Jun. 6, 2017.
U.S. Appl. No. 12/931,141, filed Jan. 25, 2011, Interview Summary, dated Oct. 22, 2015.
U.S. Appl. No. 12/931,141, filed Jan. 25, 2011, Final Office Action, dated Sep. 1, 2015.
Milne, U.S. Appl. No. 14/684,2074, filed Apr. 10, 2015, Final Office Action, dated Sep. 7, 2017.
Milne, U.S. Appl. No. 14/245,482, filed Apr. 4, 2014, Office Action, dated Mar. 20, 2017.
Milne, U.S. Appl. No. 14/245,482, filed Apr. 4, 2014, Final Office Action, dated Aug. 10, 2017.

\* cited by examiner

SOCIAL NETWORK TRANSACTION PROCESSING SYSTEM

CROSS-REFERENCE TO RELATED APPLICATIONS; BENEFIT CLAIM

This application is a Continuation of U.S. patent application Ser. No. 12/931,141 filed Jan. 25, 2011, the entire contents of which are hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

TECHNICAL FIELD

The disclosed embodiments relate generally to financial transactions and, in particular, to using social networks to execute the transfer of funds.

BACKGROUND

Conventional financial institutions only support financial transactions from one financial institution to another. To limit fraud, these financial institutions require specific information from both the provider of the funds and the recipient before executing a financial transaction. Required information typically includes the parties' full names, the names of the financial institutions, the parties' account numbers and the recipient's ABA routing number. It would be desirable for one party to send or request money without the requirement that the party have all of this additional information.

Services like Obopay use mobile telephony devices to transfer funds between parties. When it is desired to transfer funds from one party to the other, both parties register with a third party provider, such as Obopay. At least one of the parties deposits funds into the system from a conventional financial institution. Once funds have been transferred, the party with the funds may transfer all or part of the funds to the other party by accessing the Obopay software, with a mobile device, and entering in the receiver's telephone number to execute the transfer. Once the funds have been transferred, the recipient may access the funds by accessing the provider software. One drawback associated with such prior art systems is the requirement that the parties have each created a third party account with a third party provider before the funds transfer can take place.

Another drawback associated with such prior art systems is the requirement that the party seeking to transfer the funds has access to the recipient's telephone number. Still another drawback associated with such prior art systems is the difficulty associated with putting funds into and taking funds out of the system. It would, therefore, be desirable to provide a system for transferring funds from one party to another that did not require the registration of both parties before the transaction, and which did not require having the other party's telephone number stored prior to the transaction. It would also be desirable to facilitate the input and output of funds into and out of the system.

It is also known in the art to transfer funds from one party to another using alternative information, such as an email address. Paypal is an example of a financial transaction processing system that allows parties to transfer funds to one another using only the other party's email address. One drawback associated with such prior art processes is the requirement that both parties preregister with a third party provider and set up accounts with the system prior to transferring funds.

Another drawback is the requirement that the party initiating the transfer of funds must have the requesting party's email address, prior to initiating the funds transfer. While funds can be transferred directly from a Paypal account to a conventional financial institution, it would be desirable to provide a system which did not require preregistration and third-party account creation by both parties with a particular provider. It would also be desirable to provide a system that did not require the party transferring funds to have specific information about the recipient, such as email address, on hand.

SUMMARY OF THE DISCLOSED SUBJECT MATTER

The present invention includes systems and methods for transferring funds from one party to the other. A user signs into the system and requests transfer to a recipient. The system accesses a social network platform of which the user and recipient are authorized to communicate with one another and extracts additional required information regarding the recipient, such as the recipient's username.

As the user is authorized to send messages via the social network directly to the recipient, the system transfers the desired funds from the user's account to an account the system associates with the recipient's social network username. The system then uses the application programming interface of the social network to access the user's profile and send a message to the recipient's social network profile, indicating the funds have been transferred and are available to the recipient. The recipient accesses the system via a hyperlink provided in the message sent via the social network. The recipient may access the funds by providing additional identifying information or by authorizing the system access to the recipient's social network platform profile. The recipient may then transfer all or part of the funds to another party in a similar manner, or may transfer the funds from the system to vendor or a conventional financial institution.

The features and advantages described in this summary and the following detailed description are not all-inclusive. Many additional features and advantages may be apparent to one of ordinary skill in the art in view of the drawings, specification and claims presented herein.

BRIEF DESCRIPTION OF THE DRAWINGS

The present invention will now be described, by way of example, with reference to the accompanying drawings in which.

DETAILED DESCRIPTION OF THE DRAWINGS

Figure 1:
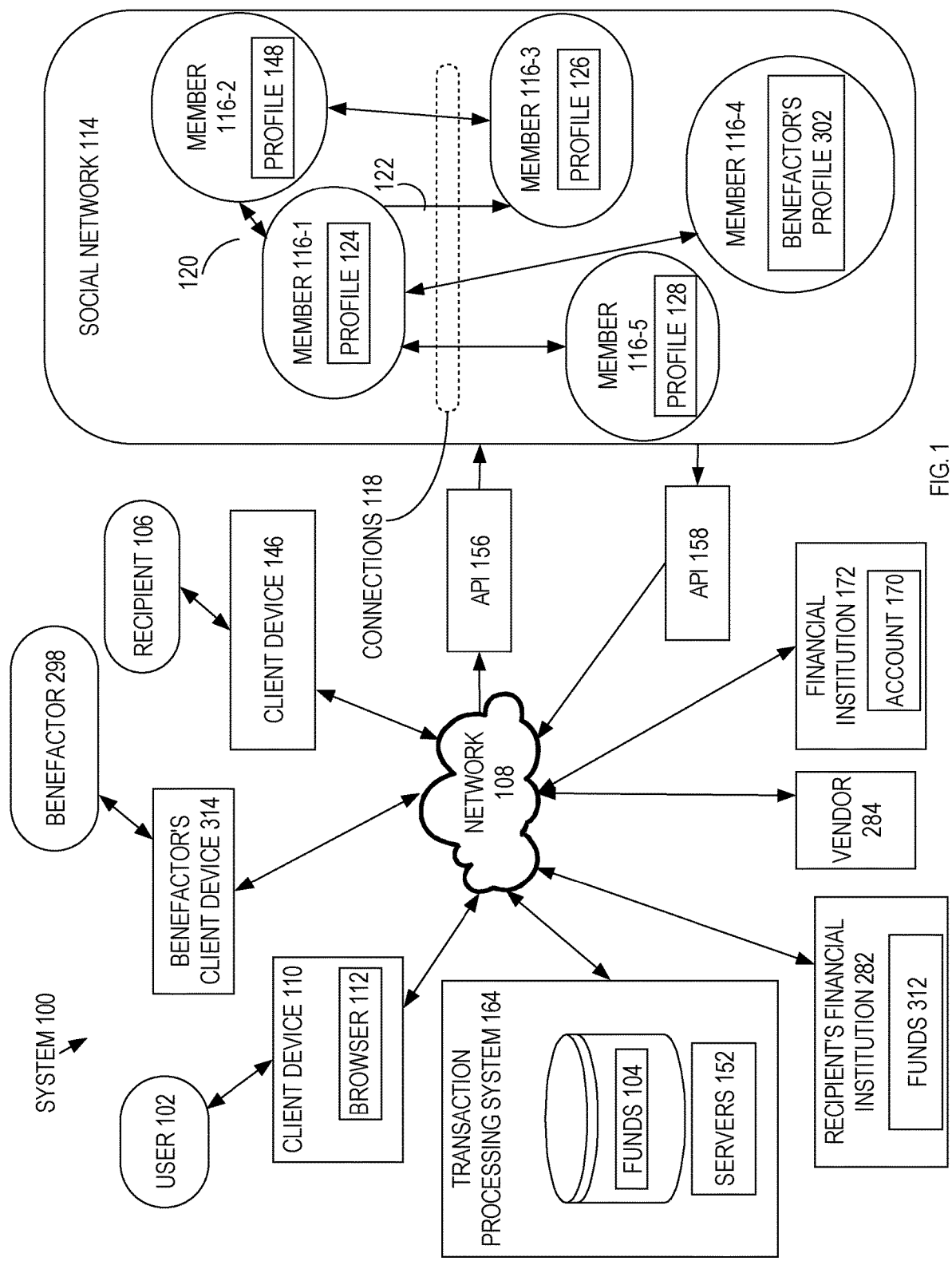
FIG. 1 illustrates a block diagram of the system architecture in accordance with one embodiment.

As shown in FIG. 1, a transaction processing system (100) is provided to allow a user (102) to transfer funds to a recipient (106) across a network (108). As shown in FIG. 1, the user (102) may use a computing device, such as a client device (110) to transfer the funds. The client device (110) may be of any type known in the art, including, but not limited to, a desktop, workstation, notebook, netbook, net tablet, mainframe, terminal or any device having the capability of communicating over a network (108). In an embodiment, the client device (110) is provided with network access applications known in the art, such as a browser (112) to facilitate communication over the network (108). The network (108) may be of any type known in the art, including, but not limited to, the Internet, a local area network (LAN), a wide-area network (WAN), telephony or any combination thereof. The client device (110) is provided and configured to execute computer executable instructions that cause the browser (112) to perform the method detailed more fully below.

The user (102) is also a member of a social network (114). The social network (114) is preferably Facebook, but may be Twitter®, Foursquare, LinkedIn or any suitable social network known in the art. Generally, the social network (114) provides its members (116-1 to 116-5) with a platform to interact with other members (116-1 to 116-5) of the social network (114). The members (116-1 to 116-5) may "friend" one another, or otherwise make internal connections, by authorizing other members (116-1 to 116-5) to access information associated with their social network profiles. Members (116-1 to 116-5) may add connections (118) to other members (116-1 to 116-5) individually, or may add groups of members (116-1 to 116-5) associated with a particular organization, hobby or group as allowed by the social network (114). Alternatively, the social network (114) may automatically add connections (118) between members (116-1 to 116-5) given various members' similar interests in various activities or past connections, such as work history or prior matriculation.

Most of the connections (118) are "two-way" connections (120), where both parties are allowed to directly communicate with one another. Some connections (118) may be one-way connections (122), where a user profile (124) is authorized to communicate directly with a friend profile (126), but the friend profile (126) is not authorized to communicate directly with the user profile (124). The friend profile (126) may still have access to other information associated with the user profile (124), but may be restricted from adding text, video or pictures to the user profile (124) or from sending non-public communication to the user profile (124) within the social network (114). The social network (114) may also allow "friend of a friend" communication, whereby even if one friend profile (126) is not directly authorized to communicate with another friend profile (128), if the friend profile (126) is authorized to connect to other friend profiles which are authorized to directly communicate with the friend profile (128), the friend profile (126) is thereby authorized, through this string of authorizations, to communicate directly with the friend profile (128).

While the term "friend" is used to describe connection between profiles in the social network (114), there is no requirement that the connected profiles be associated with people or entities who are actually friends or who have ever communicated outside of the social network (114). The term "friend" is merely used to describe the existence of connections between profiles in the social network (114) authorized by the parties involved.

Figure 2:
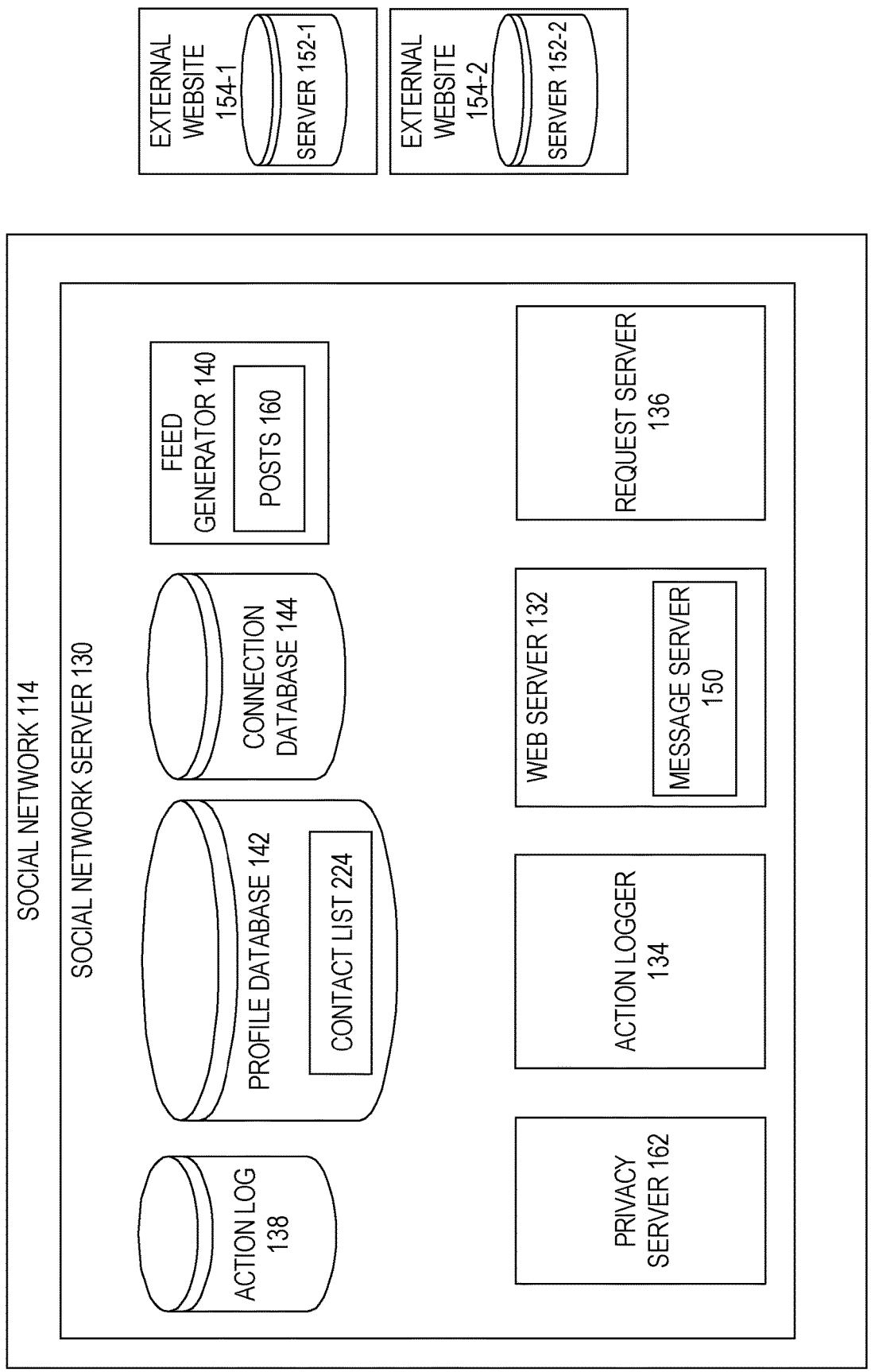
FIG. 2 illustrates a block diagram of the social network architecture in accordance with one embodiment.

FIG. 2 is a block diagram of a social network server (130) associated with the social network (114). As used herein, the term "website" means any system providing content and is not limited to those systems supporting content provided via the Internet or the http protocol. In general functions described herein as being performed on the server side may also be performed on the client side as appropriate. The social network server (130) has a web server (132), an action logger (134), an application programming interface (API) request server (136), an action log (138), a feed generator (140), a member profile database (142) and a connection database (144). The social network (114) and social network server (130) may include more or less features, or may include modifications of the features described herein. Conventional features, such as firewalls, load balancers, application servers, fail over servers, site management tools, as well as additional conventional known features are not shown to allow a clearer illustration of the novel features of the system.

The social network server (130) allows a user (102) to create the user profile (124). The user profile (124) may include information about the user (102), such as biographic information, user posted text, hyperlinks, photos or video and statistics regarding the user's use of the social network (114). The biographic information may include work experience, education, physical description, likes, dislikes, hobbies, preferences, geographic location and similar information. The social network server (130) also stores information regarding the connections (118) associated with the user profile (124). To make a connection with a friend profile (128), the user (102) accesses the friend profile (128) using the user profile (124) of the social network (114). While the friend profile (128) may be completely or partially visible, there will be a designated process to request a connection, such as a button or hyperlink. On pressing the button, the user's request for connection is passed along to the owner of the friend profile (128). In some social networks (114), the social network (114) allows the user (102) to view the complete friend profile (128) upon requesting the connection. In other social networks (114), the social network (114) does not allow viewing of the friend profile (128) until the owner of the friend profile (128) accepts the connection request, in which case the social network (114) stores the connection between the user profile (124) and friend profile (128) in the connection database (144). Most social networks also provide a process to allow a user to block access to the user profile by other selected members of the social network.

In still other social networks (114), the social network (114) allows the user profile (124) access to viewing the friend profile (128) upon the request for connection, but does not allow the user profile (124) direct communication rights with the friend profile (128) unless the owner of the friend profile (128) accepts the connection request. Still other social networks (114) allow the user profile (124) to view the complete friend profile (128), but may only authorize direct communication from the friend profile (128) to the user profile (124), and withhold direct communication authorization from the user profile (124) to the friend profile (128) until the owner of the friend profile (128) accepts the connection request from the user profile (124).

The recipient (106) accesses the network (108) and social network (114) in a similar manner using a client device (146) and creates a recipient profile (148) in a manner such as that described above. Thereafter, the user (102) may send a connection request to the social network (114) to the recipient (106) through the recipient profile (148). Once the recipient (106) accepts the connection request, the social network (114) stores the connection in the connection database (144).

In addition to serving webpages to the user (102) and recipient (106) via the social network server (130), the social network (114) may serve other web related content, such as Flash, Java, XML and similar content. The web server (132) is provided with a message server (150) to allow messages to be transmitted between the profiles (124), (126), (128) and (148) associated with the social network (114). The messages may be in the form of email, chat, text. SMS, or any desired messaging format known in the art.

In an exemplary embodiment, the API request server (136) may correspond to one or more dynamic link libraries (DLL) or other libraries that comprise standardized functions for communicating with the web server (132). The API request server (136) allows servers (152-1, 152-2) associated with external websites (154-1, 154-2) to access information associated with the social network server (130) by calling APIs (156) and to execute operations on the social network server (130), such as sending messages to other member profiles, by calling other APIs (158). The external websites (154-1, 154-2) may be any websites operating from a server other than the server operating the social network (114). When it is desired to receive information from the social network server (130), such as information relating to the user profile (124), the external, system (154) sends an API request to the social network server (130) via the network (108). The API request server (136) receives the API request and calls the appropriate API (156) to determine if the external system (e.g. 154-1) is authorized to obtain the requested information, to gather the requested information which is authorized to be provided to the external system (154-1) and to return the authorized information back to the external system (154-1) via the network (108).

When it is desired to cause the social network server (130) to perform an action, the external system (154-1) sends an API request to the social network server (130). The API request server (136) calls the appropriate API (158) to determine if the operation is authorized for the external system (154-1) and, if so, causes the operation to be executed on the social network server (130). Depending on the request, the API request server (136) may call another API (156) to return information to the external system (154-1) indicating that the operation has been completed or denied.

The action logger (134) monitors actions by the user (102) and recipient (106) associated with the social network (114), whether such actions take place on their respective profiles (124) and (148), elsewhere on the social network server (130) or, if authorized, other places outside of the social network server (130). All actions of the user (102) and the recipient (106) monitored by the action logger (134) are recorded and stored in the action log (138) or other database. Types of actions that may be recorded and stored include, but are not limited to, requesting connections between members, authorizing connections between members, sending messages between members, opening messages between members, suggesting connections, viewing content on other member's profiles, requesting, announcing or RSVPing to events.

The feed generator (140) displays "posts" (160) in reverse chronological order on the user profile (124). The posts may be other member's comments, notices of upcoming events or feeds from third party organizations, such as news outlets. The feed generator (140) may be modified by the user (102) to customize the posts (160) the feed generator (140) displays on the user profile (124). The social network server (130) is also provided with a privacy server (162) that restricts access to information stored on the social network server (130), including information stored in the action log (138). The user (102) may be allowed to modify settings associated with the privacy server (162) via the user profile (124) to determine how information related to the user (102) is stored and shared on the social network server (130). The user (102) may authorize the social network server (130) to share information about the user (102) only with specifically authorized members (116-1 to 116-5) associated with social network server (130) with various software applications, external systems or any system seeking access to the information. The information stored by the user (102) on the social network server (130) may include text, photographs, audio recordings, video, including contact lists and connections formed by the user (102) through the social network server (130).

Figure 3:
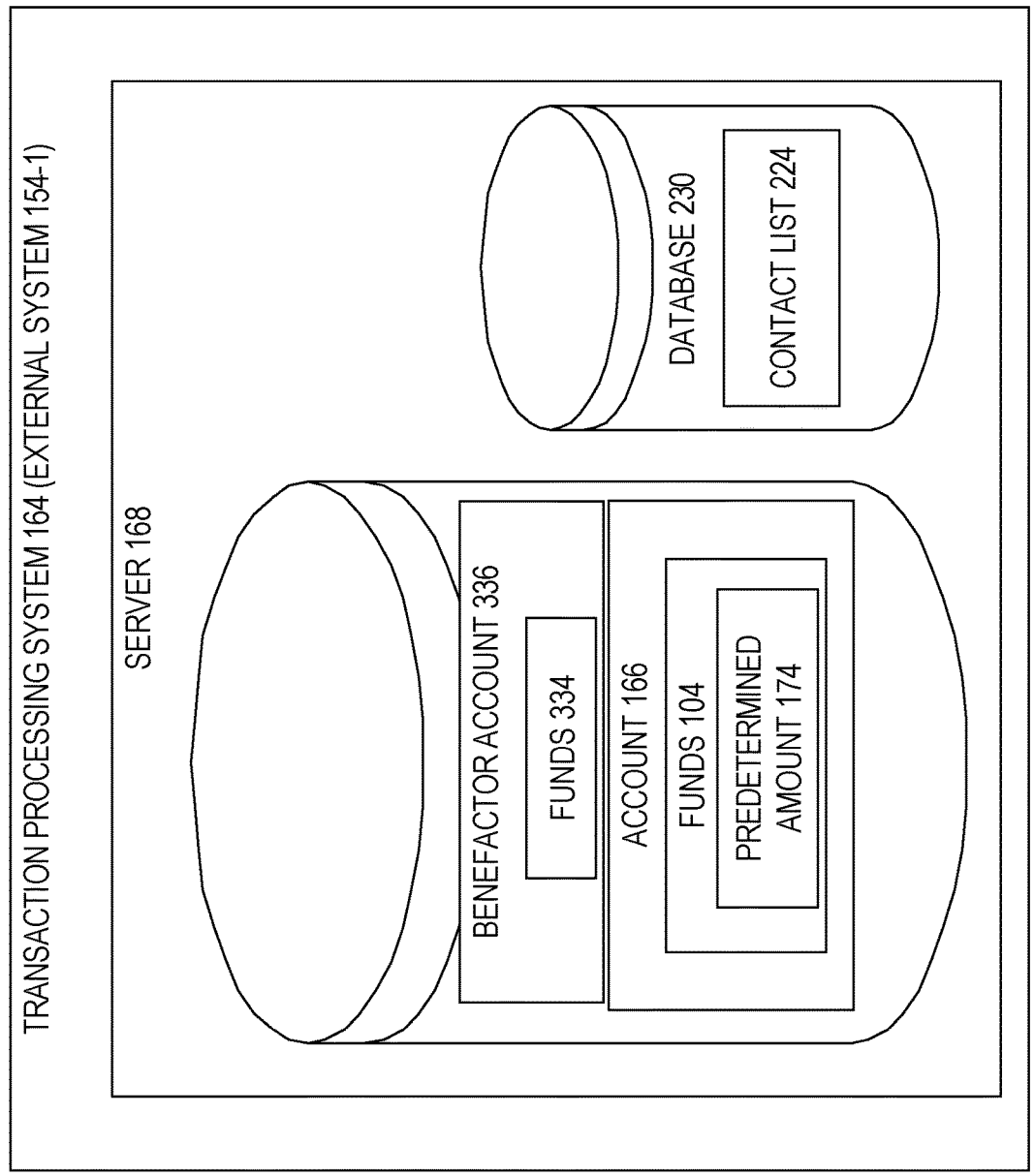
FIG. 3 illustrates a block diagram of the financial system architecture in accordance with one embodiment.

In an embodiment, the external system (154-1) is a financial transaction processing system shown generally as (164) in FIG. 3. An embodiment of a financial transaction processing system which may be adapted to the present system (100) is described in U.S. Letters patent application Ser. No. 12/658,278, which is incorporated hereby by reference.

When the user (102) desires to open an account (166) with the financial transaction processing system (164), the user (102) accesses, via the network (108), a server (168) associated the financial transaction processing system (164), and provides identifying information, such as user name and password, to create a user account (166).

Alternatively, the user (102) may provide the information telephonically, via electronic mail, facsimile or any suitable method of communication. When it is desired to place funds (104) into the user account (166), the user (102) accesses a portion of the server (168) protected by secure socket layer (SSL) transmission or similar security protocol. The user (102) then transfers funds into the user account (166) by any known means, including but not limited to check, credit card, debit card, gift card, pre-paid card, other ACH processing, physically delivered cash deposit or any known system of deposit. The user (102) may also receive funds into the account (166) from another user of the financial transaction processing system (164) via direct deposit through the server (168).

To deposit funds into the user account (166) from an external financial institution (172), such as a bank or credit union, holding funds of the user (102), the user (102) accesses a user account (170) associated with a financial institution (172) in a manner such as that known in the art. The user (102) then instructs the financial institution (172) via electronic correspondence, telephonically or by other known manner, to transfer a first predetermined amount of funds (174) through the network (108) to the user account (166) associated with the financial transaction processing system (164).

To transmit a second predetermined amount of funds (104) from the user (102) to the recipient (106), the user (102) preferably has an authorized connection with the recipient (106) within the social network (114). If the user (102) does not already have an existing authorized connection with the recipient (106), the user (102) logs into the social network server (130) and sends, through the user profile (124) or by other known means, a request to connect to the recipient (106) through the recipient profile (148). The recipient (106) accepts the connection and the connection is stored in the action logger (134).

Figure 4:
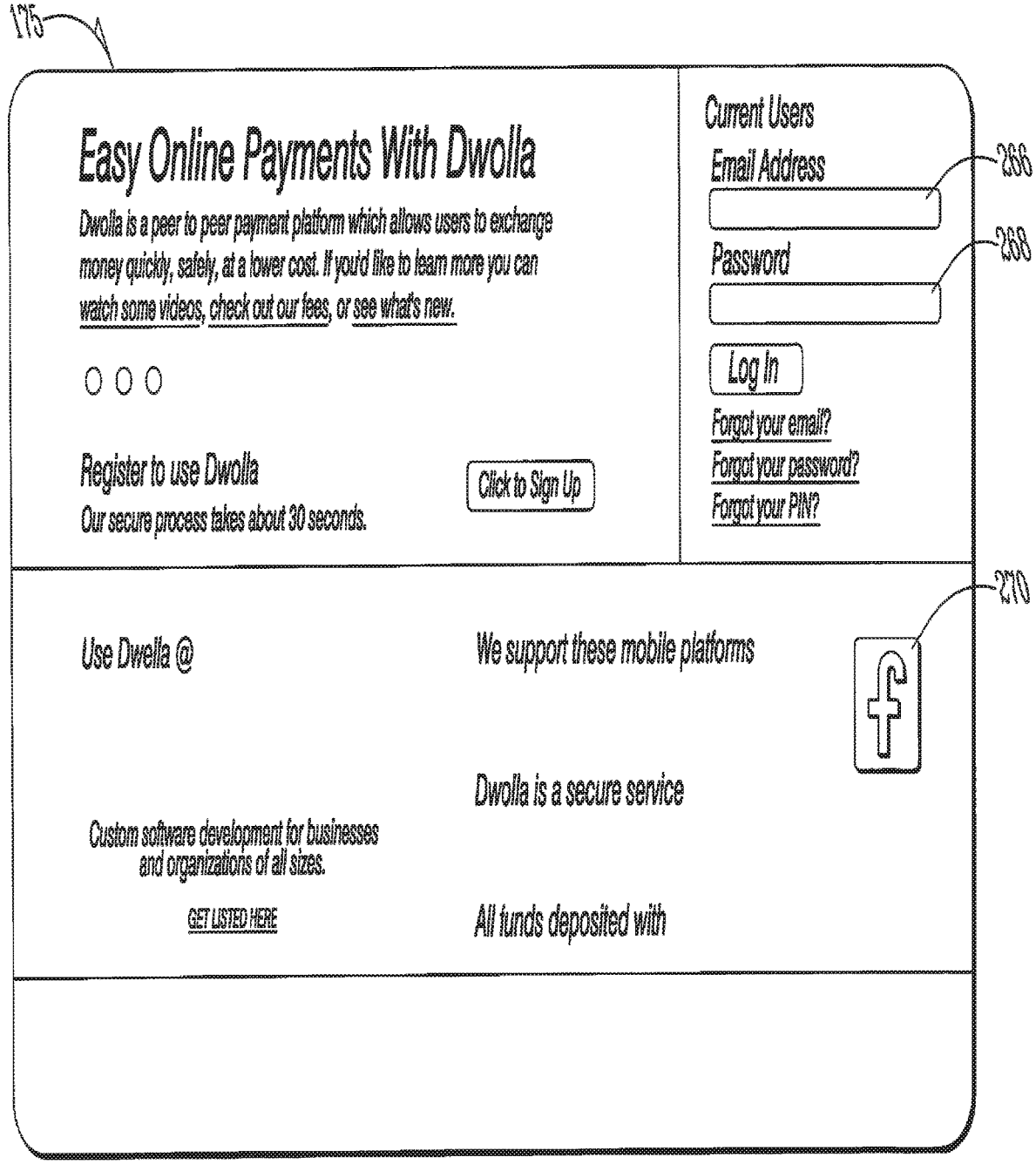
FIG. 4 illustrates an example display from an application running on an external system, the display showing the application's home webpage in accordance with one embodiment.

To transmit the funds (104) to the recipient (106), the user (102) accesses the server (168) associated with the financial transaction processing system (164), and logs into the system (164) through a server interface such as the homepage (175), shown generally in FIG. 4, using the user's email address and password or other known authorization process.

Figure 5:
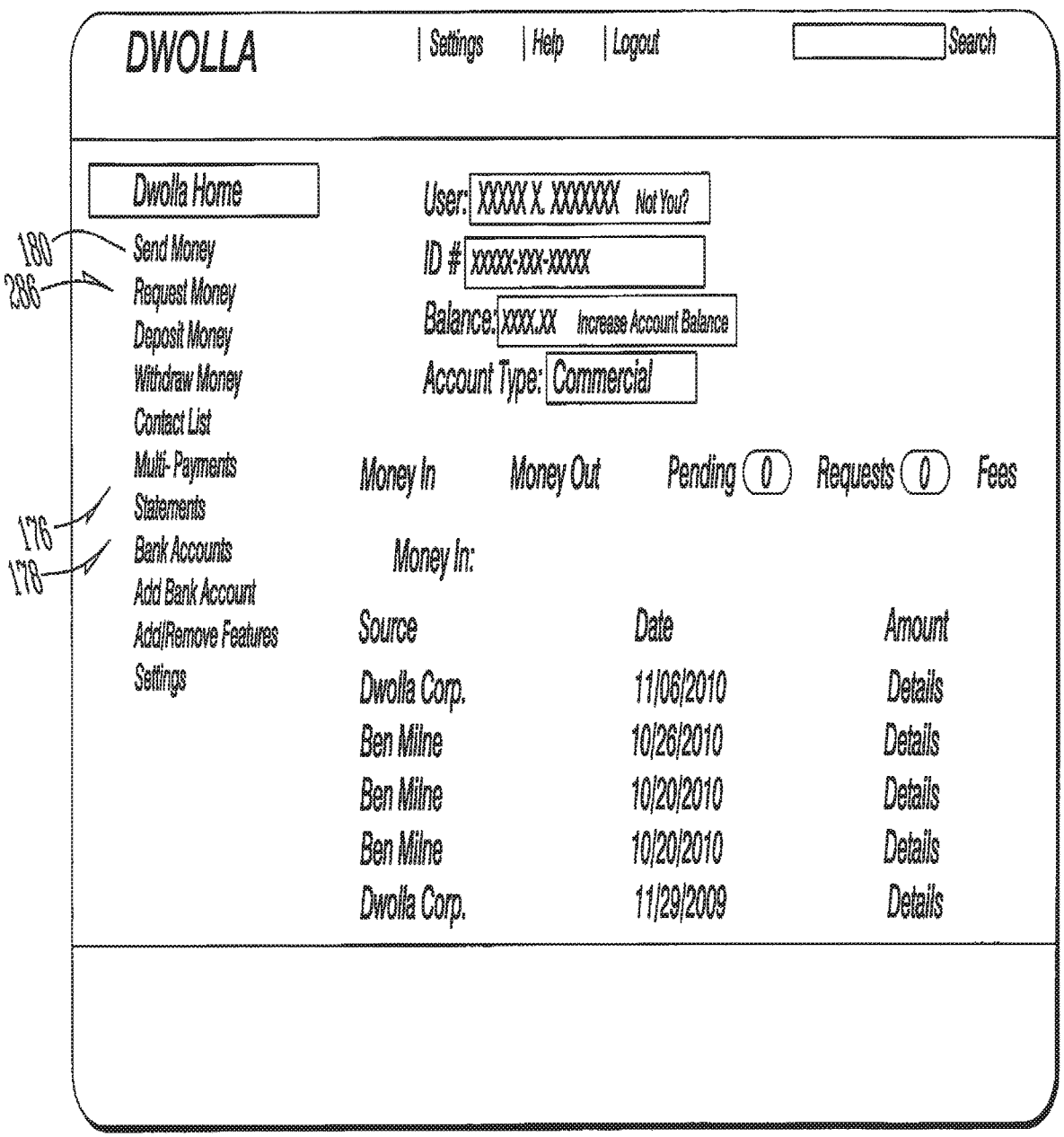
FIG. 5 illustrates an example display from an application running on an external system, the display showing a user webpage in accordance with one embodiment.

Once the user has logged into the system (164), the system (164) displays the user webpage (176). (FIG. 5). The user webpage (176) displays a sidebar menu (178) listing "send money" as an option and provides a send money button (180) to display the send money webpage (182). When the user (102) selects the send money button (180), the system (164) displays the send money webpage (182), shown generally as (182) in FIG. 6. The send money webpage (182) displays the user name (184), the account number (186), the user's balance (188), as well as other identifying information (190) about the account (166).

Figure 6:
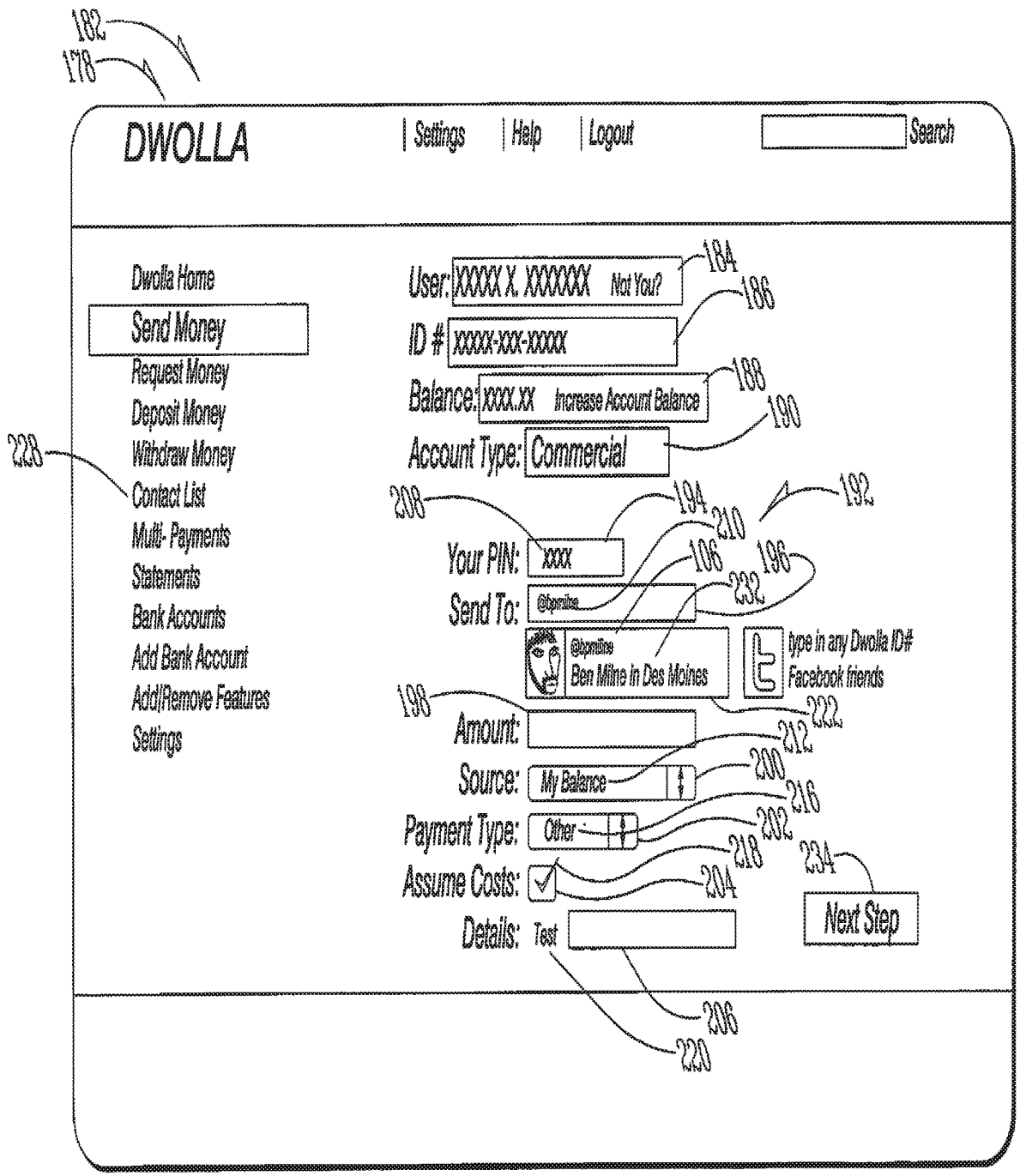
FIG. 6 illustrates an example display from an application running on an external system, the display showing a send money webpage in accordance with one embodiment.

The send money webpage (182) also displays fields (192) to be filled in by the user (102), such as a pin number field (194), a send to field (196) an amount field (198), a source field (200), a payment type field (202), an assumption of cost checkbox (204) and a details field (206). The user (102) fills in these fields (192) with the user's pin number (208), the name (210) of the recipient (106), the source (212) from which the transfer funds are to come, the payment type (216), a check (218) if desired in the check box (204) and a description (220) of details relating to the transaction. As shown in FIG. 6, when the user (102) begins typing the recipient name (210) in the send to field (196), the system (164) drops down a menu (222) of potential recipients corresponding to the characters typed.

Figure 7:
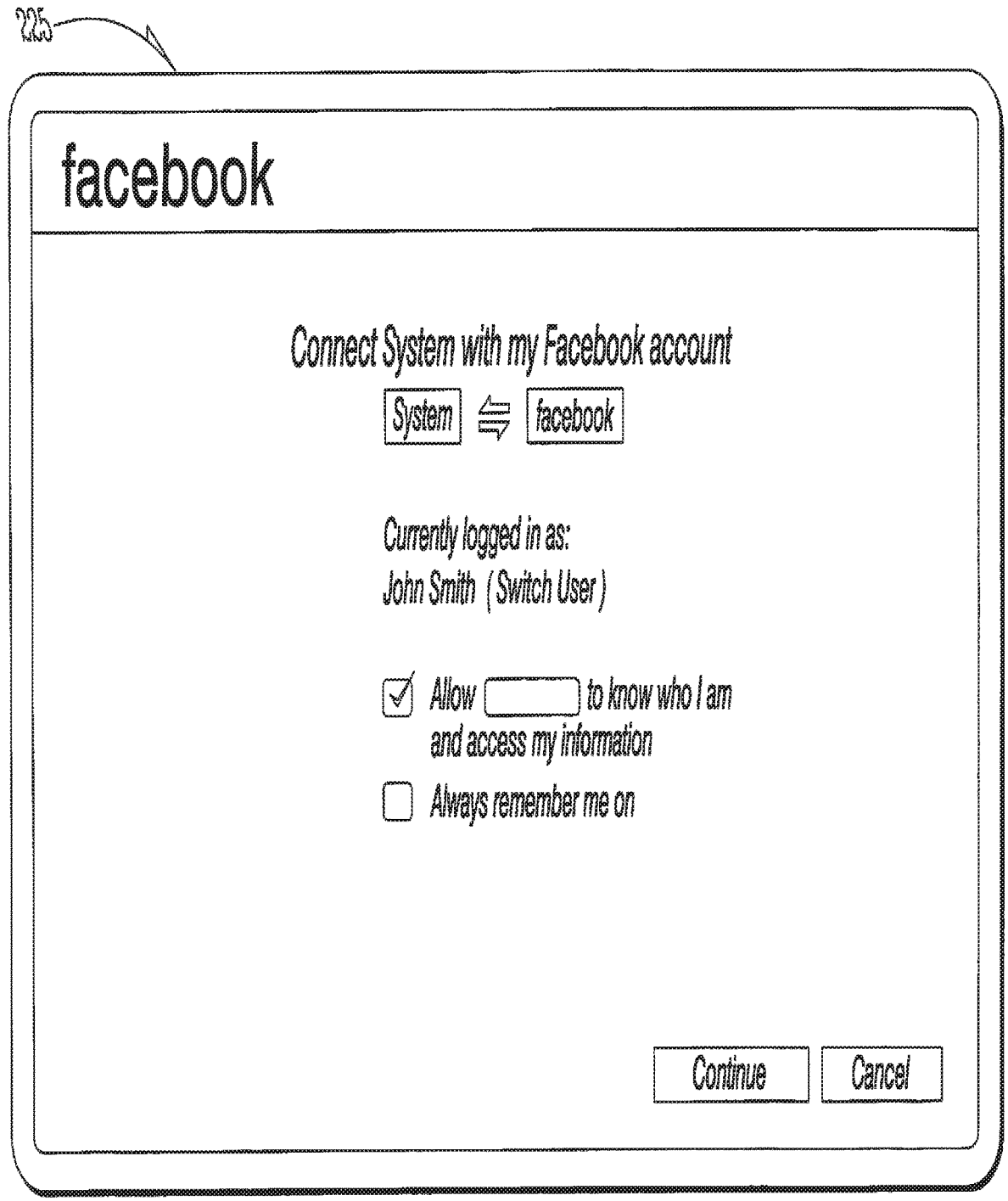
FIG. 7 illustrates an example display from an application running on a social network, the display showing authorization webpage in accordance with one embodiment.

To propagate the drop-down menu (222), the financial transaction processing system (164) cross-references a contact list (224) stored in the profile database (142) of the social network server (130) associated with the user profile (124). Alternatively, the user may access the financial transaction processing system (164) through an intermediate server. The intermediate server may cache information received from the financial transaction processing system, such as the contact list (224). After the contact list (224) has been cached, the intermediate server may propagate the menu (222) of potential recipients directly, rather than accessing the financial transaction processing system (164) for the information. When the system (164) seeks to access the contact list (224) for the first time, if the user (102) is already logged into the social network (114), the social network server (130) generates and displays to the user (102) an authorization webpage (225) as shown in FIG. 7. Alternatively, the authorization may be executed via Open Authorization (OAuth) or any known authorization system. Authorizing the system (164) to access the social network server (130), allows the financial transaction processing system (164) to retrieve information from the social network server (130) using the API calls (156) and (158). This authorization may be executed the first time the user (102) receives funds through the financial transaction processing system (164) or creates an account (166) within the system (164).

Alternatively, the user (102) may execute the authorization during the fund transfer process. If the user (102) is not already logged into the social network (114), the social network server (130) may display an authorization website where the user (102) is prompted to enter a user name and password associated with the social network (114) and select an authorization button. Alternatively, the user (102) may select the contact list button (228) from the sidebar menu (178) and select an add social network option which allows the user (102) to authorize additional social networks in a manner such as that described above.

Once the authorization has been completed, the user (102) is returned to the send money webpage (182) associated with the system (164). The financial transaction processing system (164) sends an API request for the contact list (224) through the network (108) to the social network server (130). The API request server (136) associated with the social network server (130) processes the request from the financial transaction processing system (164) by calling the API (156) to confirm the financial transaction processing system (164) is authorized to obtain the contact information, collect the contact list (224) associated with the user (102) and return that information to the financial transaction processing system (164) via the network (108). The financial transaction processing system (164) may store the user's contact list (224) in a database (230), or may submit an API request to the social network (114) each time information from the contact list (224) is needed.

As shown in FIG. 6, as the user (102) types the recipient name (210) into the send to field (196), the financial transaction processing system (164) displays associated contacts (232) on the drop-down menu (222). As the user (102) continues to type, the financial transaction processing system (164) eliminates non-matching contacts (232) from the drop-down menu (222). If desired, the user (102) may stop typing at any point and select the desired recipient (106) from the drop-down menu (222), thereby causing the system (164) to auto-complete the send to field (196) with the recipient name (210).

Figure 8:
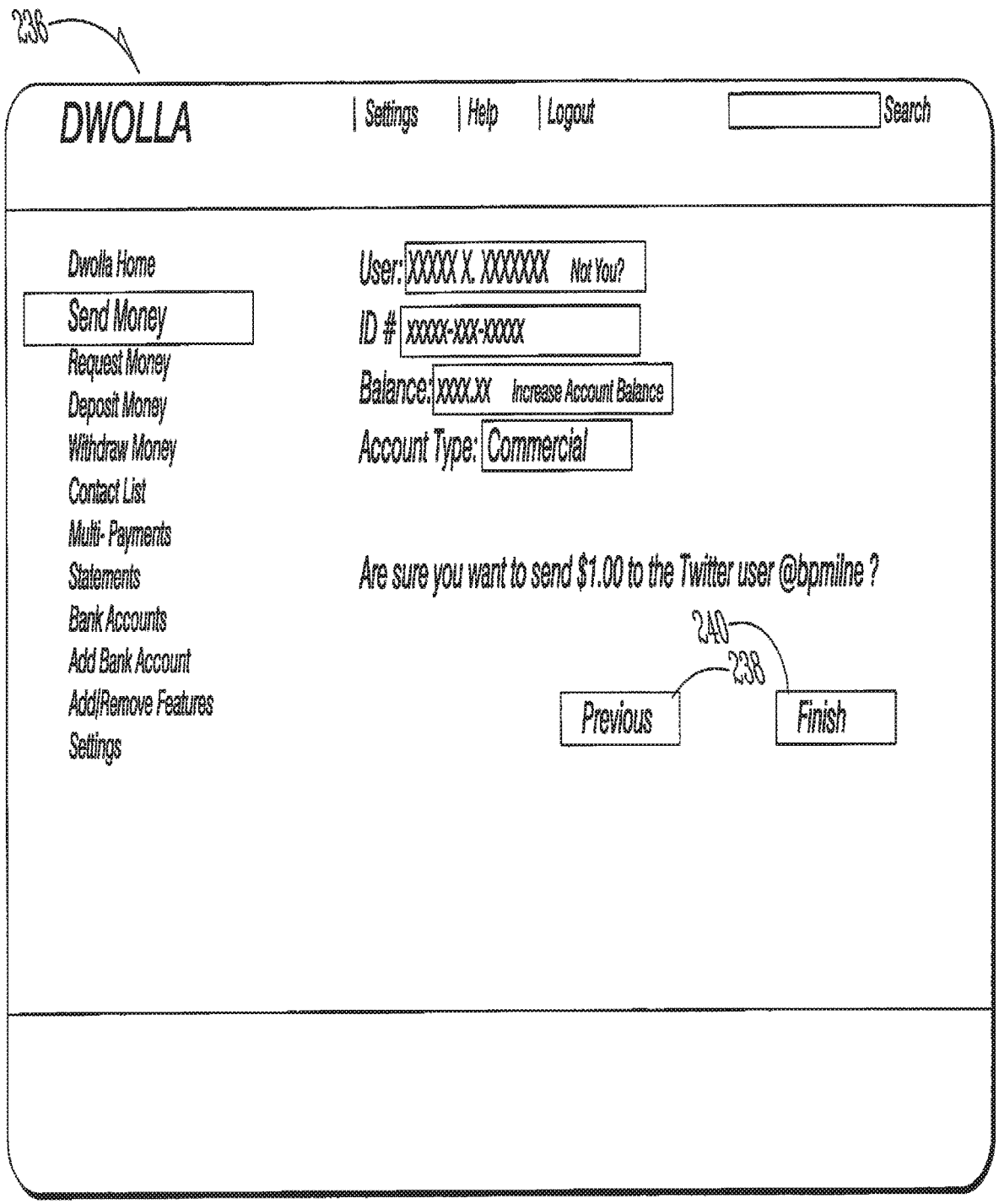
FIG. 8 illustrates an example display from an application running on an external system, the display showing a confirmation webpage in accordance with one embodiment.
Figure 9:
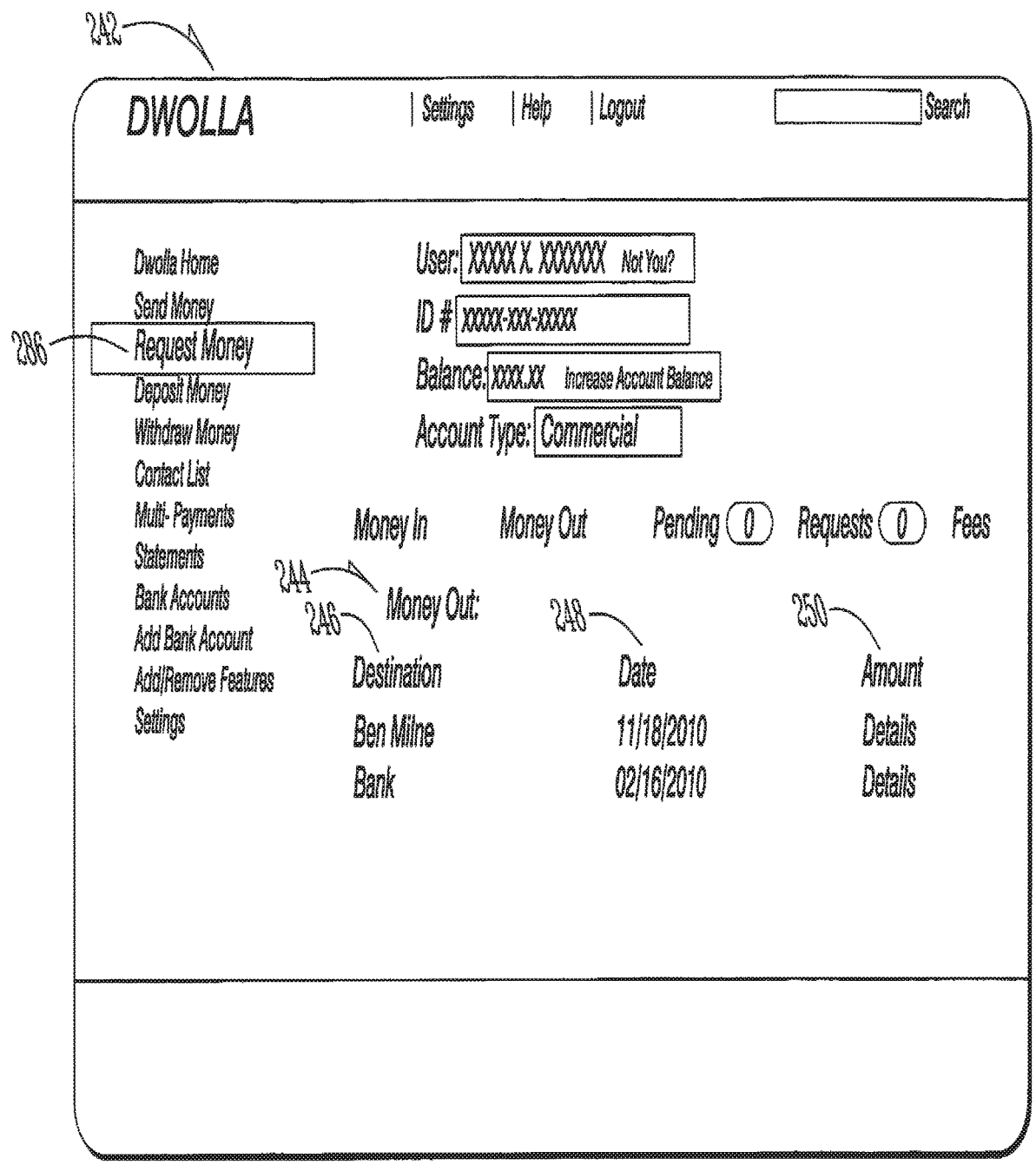
FIG. 9 illustrates an example display from an application running on an external system, the display showing the detail webpage in accordance with one embodiment.
Figure 10:
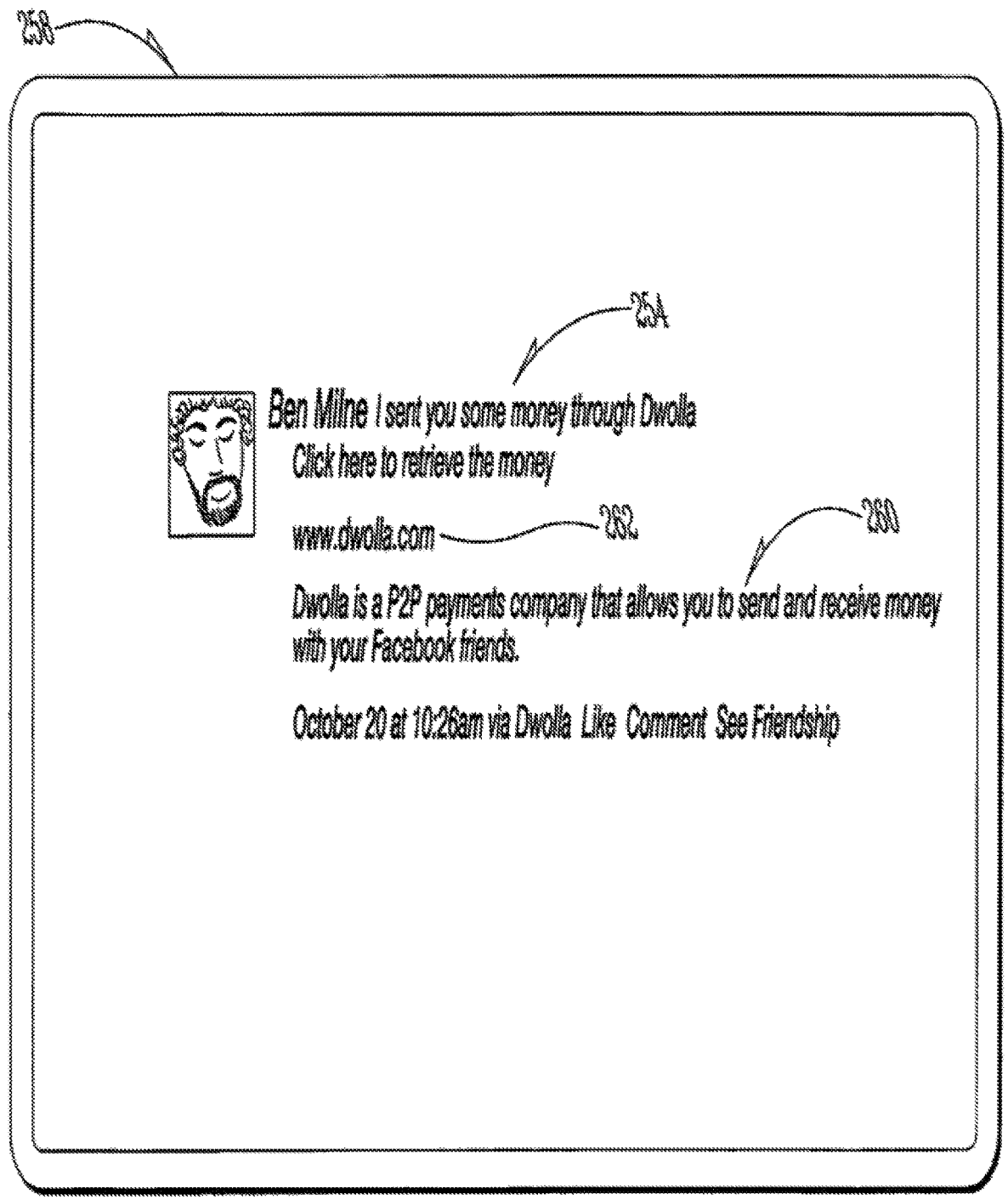
FIG. 10 illustrates an example display from an application running on a social network, the display showing a funds request message in accordance with one embodiment.
Figure 11:
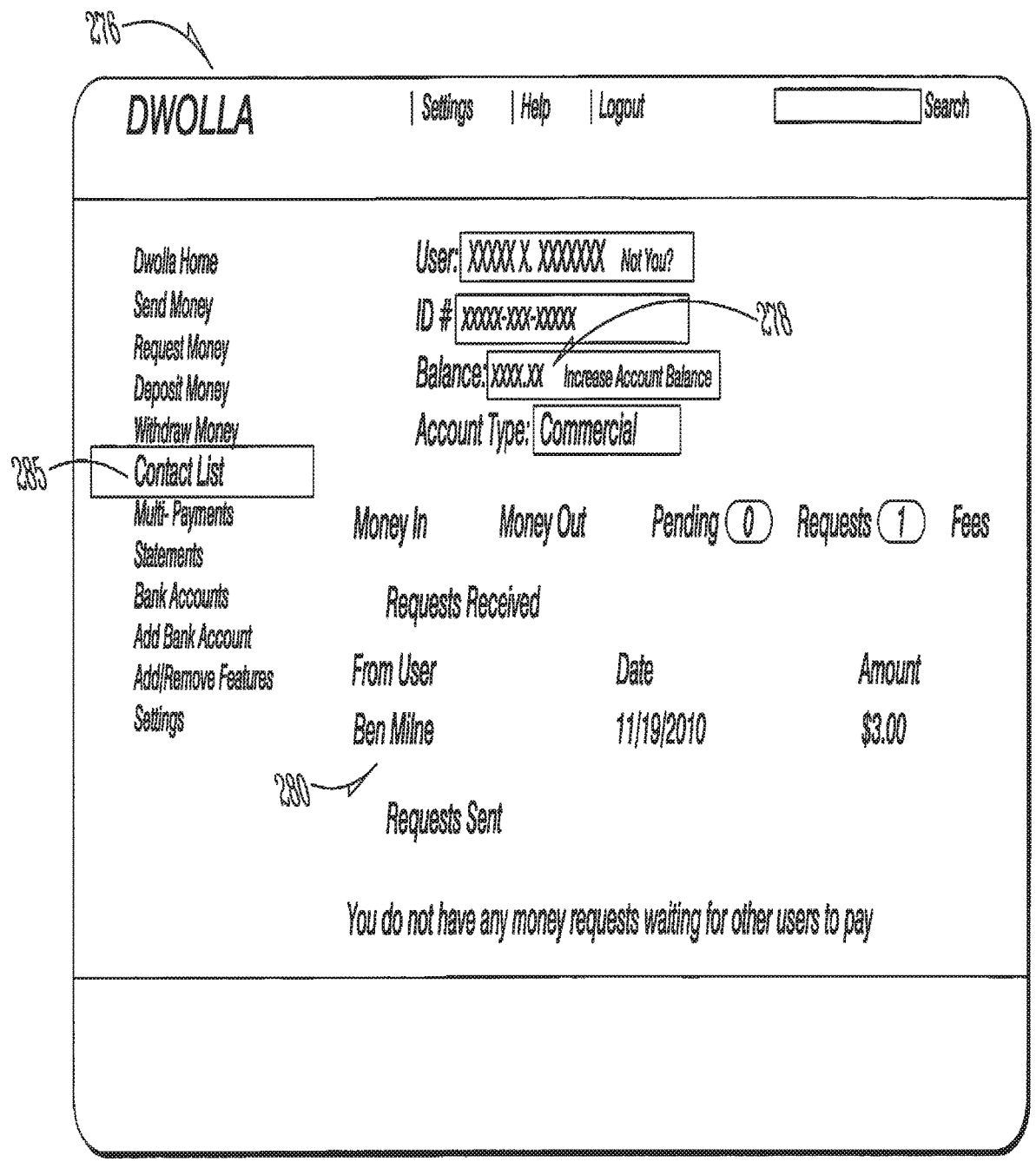
FIG. 11 illustrates an example display from an application running on an external system, the display showing a recipient's account webpage in accordance with one embodiment.
Figure 12:
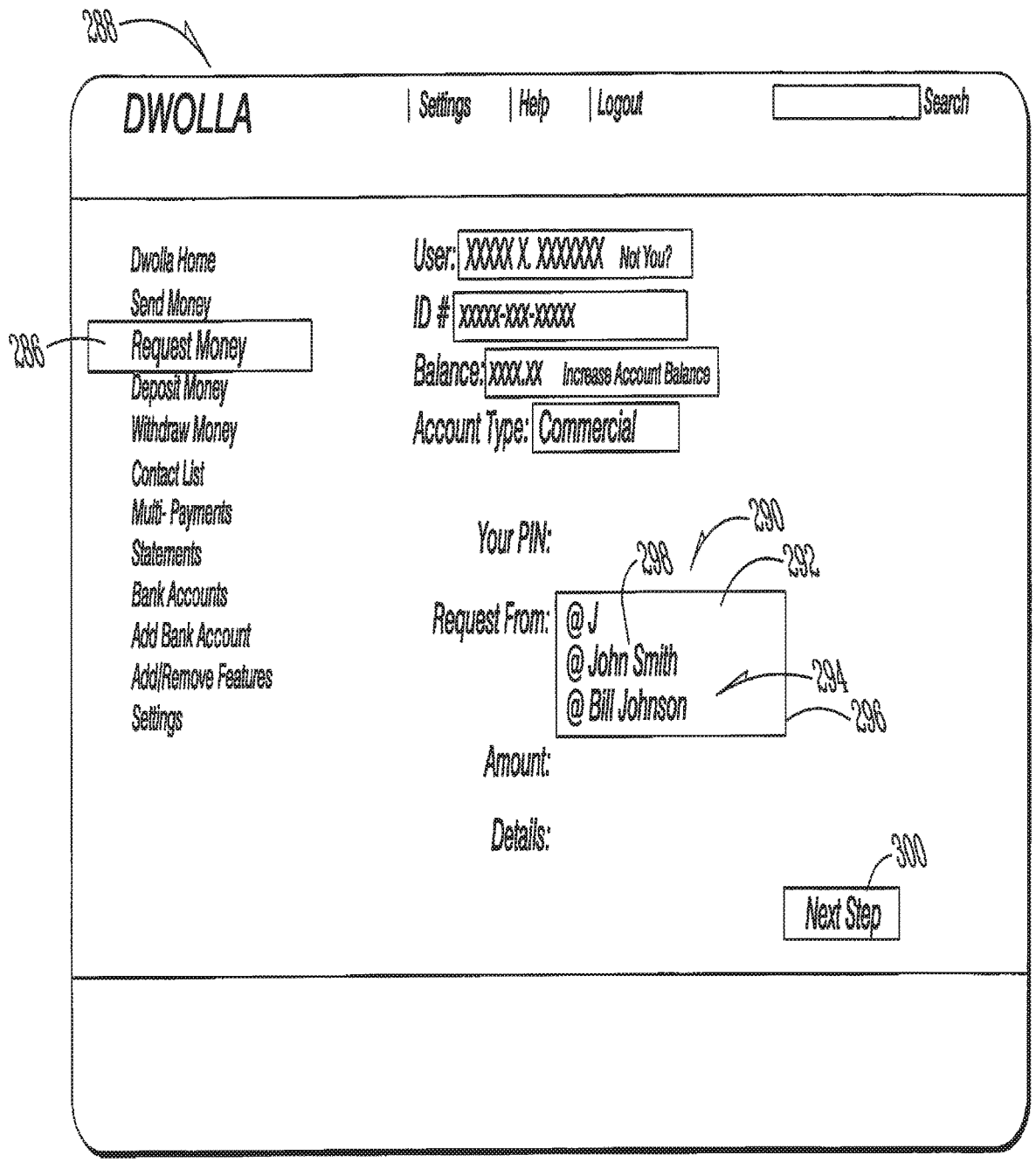
FIG. 12 illustrates an example display from an application running on an external system, the display showing a request money webpage in accordance with one embodiment.
Figure 13:
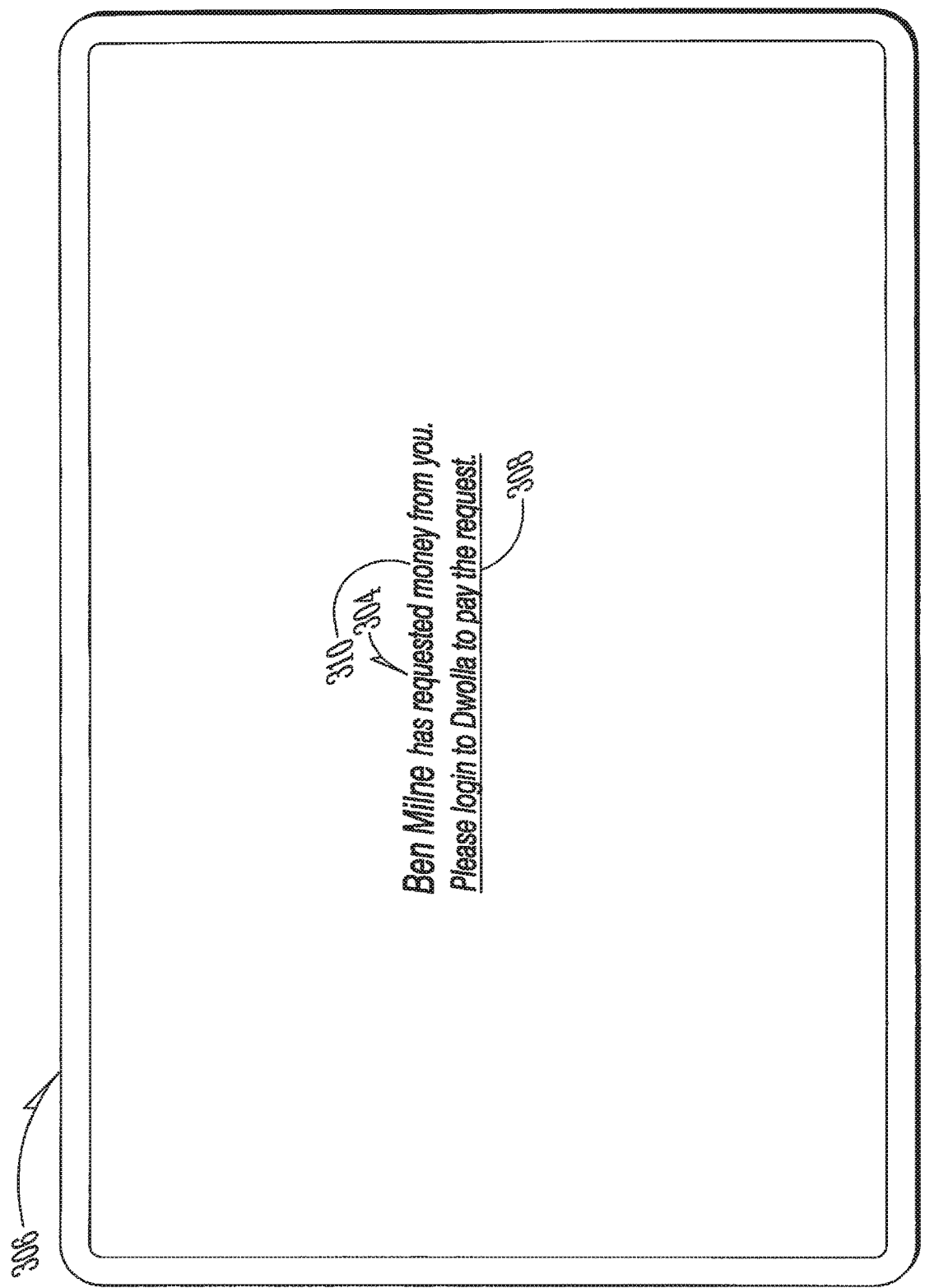
FIG. 13 illustrates an example display from an application running on a social network, the display showing a benefactor's message page in accordance with one embodiment.

As noted in FIG. 6, the name (210) may be the recipient's actual name, a nickname, a street name, user name or standardized format name, such as a user name provided by the "@" or other naming protocol utilized by a specific social network. Once the user (102) has completed the fields (192), the user (102) selects the next step button (234), causing the system (164) to display the confirmation page (236) shown in FIG. 8. If the user (102) notices a mistake in the information regarding the proposed transfer, the user (102) selects the previous button (238) causing the system (164) to return the user webpage (176) with the previously completed fields (192). This allows the user (102) to make changes as required. If the information displayed on the confirmation page (236) is correct, the user (102) selects the finish button (240), which causes the system (164) to display the detail page (242) shown in FIG. 9. The detail page (242) includes a history (244) of previous transactions, including the destination (246), the date (248) and the amount (250). The detail page (242) also includes additional tabs (252) to allow the user (102) to review information regarding funds received, funds sent, pending transactions, requests for funds and associated fees.

Upon execution of the transfer, the system (164) debits the user's account (170) by the amount of the transfer and creates a recipient account (274) using information obtained from the user (102), including the recipient's user name associated with the social network (108). The system (164) credits the recipient account (274) with the amount of the transfer. The system (164) may charge a fee, which may be extracted from either the user account (170) or from funds transferred into the recipient account (274) as indicated by the user (102). If the recipient (106) already has an account created with the system (164), the system debits the user account (170), credits the recipient account (274), and debits the selected account for the amount of the transaction fee.

Once the user (102) selects the finish button (240) on the confirmation page (236), the system sends an API request to the social network (114). The API request server (236) receives the request and calls the appropriate API (158) to determine if the financial transaction processing system (164) is authorized to access the social network (114) via the user profile (124). If the authorization is confirmed, the API (158) sends a message (254) to the recipient profile (148). Preferably, the message (254) is indicated as having originated from the user profile (124). The message (254) may be private for the recipient (106), displayed as a post on the recipient profile (148) or public accessible as desired.

When the recipient (106) accesses a message page (258) associated with the recipient profile (148) of the social network (114), the social network server (130) displays the message (254), along with information (260) regarding the transaction. (FIGS. 1-3 and 10). The message (254) also includes a hyperlink (262) to the server (168) associated with the financial transaction processing system (164).

When it is desired to retrieve the funds (174), the recipient (106) may go directly to the financial transaction processing system (164). Preferably, the recipient (106) selects the hyperlink (262) associated with the message (254). Selecting the hyperlink (262) causes the client device (110) to display the homepage (175), including email and password fields (266) and (268), and a social network authorization button (270). (FIGS. 1-4).

Once the recipient (106) has selected the hyperlink (262) in the message (254), the financial transaction processing system (164) displays for the recipient (106) the homepage (175) displaying the proper social network authorization button (270) associated with the hyperlink (262). If the recipient (106) has an existing account with the system (164), the recipient (106) fills in the appropriate email address and username in the fields (266) and (268), and selects the submit button (272), thereby allowing the recipient (106) access to the recipient's account (274). If the recipient (106) has not previously created an account with the financial transaction processing system (164), the recipient (106) selects the social network authorization button (270). This causes the system (164) to send an API request to the social network server (130) via the network (108). The social network server (130) generates and displays to the recipient (106) the authorization webpage (225) that the recipient (106) authorizes in a manner such as that described above.

The system (164) displays a recipient's account page (276) showing the balance (278) and a record of the transaction (280). The recipient (106) may keep the funds (174) in the system (164), transfer the funds (174) to another user of the system (164), transfer the funds to the recipient's financial institution (282), transfer the funds to a vendor (284) set up to receive funds from the financial transaction processing system (164), obtain the funds (174) in the form of a check or debit card, or transfer the funds (174) in any manner known in the art. (FIGS. 1-3 and 11).

As soon as the financial transaction processing system (164) displays the recipient's account page (276), the recipient (106) is allowed to access the funds (174) and review the account (274) in a manner such as that described above. The recipient (106) may also select the contact list button (285) from the sidebar menu (178) to add additional social networks and contacts in a manner such as that described above.

If the user (102) desires to request funds (104), the user (102) logs into the server (168) of the financial transaction processing system (164) and from the sidebar menu (178) selects the request money button (286). (FIGS. 1-3, 5 and 13). In response, the system (164) displays the request money webpage (288) with various fields (290) to be filled in a manner such as that described above. As the user (102) fills in the request funds field (292) the system (164) either accesses the contact list (224) from the database (230) or sends an API request to the social network server (130). The API request server (136) confirms authorization of the request and returns the contact information to the system (164) in a manner such as that described above. The system (164) then lists associated contacts (294) in a drop-down menu (296). The user (102) may either continue filling in the request form field (292) or select the desired benefactor (298) from the drop-down menu (296).

The system (164) may also autofill the name of the benefactor (298) into the request from field (292) if the information provided into the field (292) by the user (102) matches a single contact. Once the user (102) has filled out the fields (290) appropriately, the user (102) selects the next step button (300) and confirms the request on a subsequent confirmation page, in a manner such as that described above. Upon selection of the next step button (300) by the user (102), the system (164) sends an API request to the social network server (130) where the API request server (136) calls the appropriate API (158) to confirm that the user (102) and benefactor (298) are "friends" or are otherwise connected. Upon confirmation of the connection, the API (158) sends a message (304) to the benefactor's profile (302), preferably with an indication that the message (304) was posted through the user profile (124).

When the benefactor (298) logs into the social network server (130) and requests messages from the web server (132), the web server (132) displays the benefactor's message page (306) which lists the message (306) which contains a hyperlink (308) and explanatory information (310), such as text, describing the user's request. If the benefactor (298) wishes to provide funds (312) to the user (102), the benefactor (298) selects the hyperlink (308) causing the financial transaction processing system (164) to display the financial transaction processing system server (168) on the benefactor's client device (314)

Figure 14:
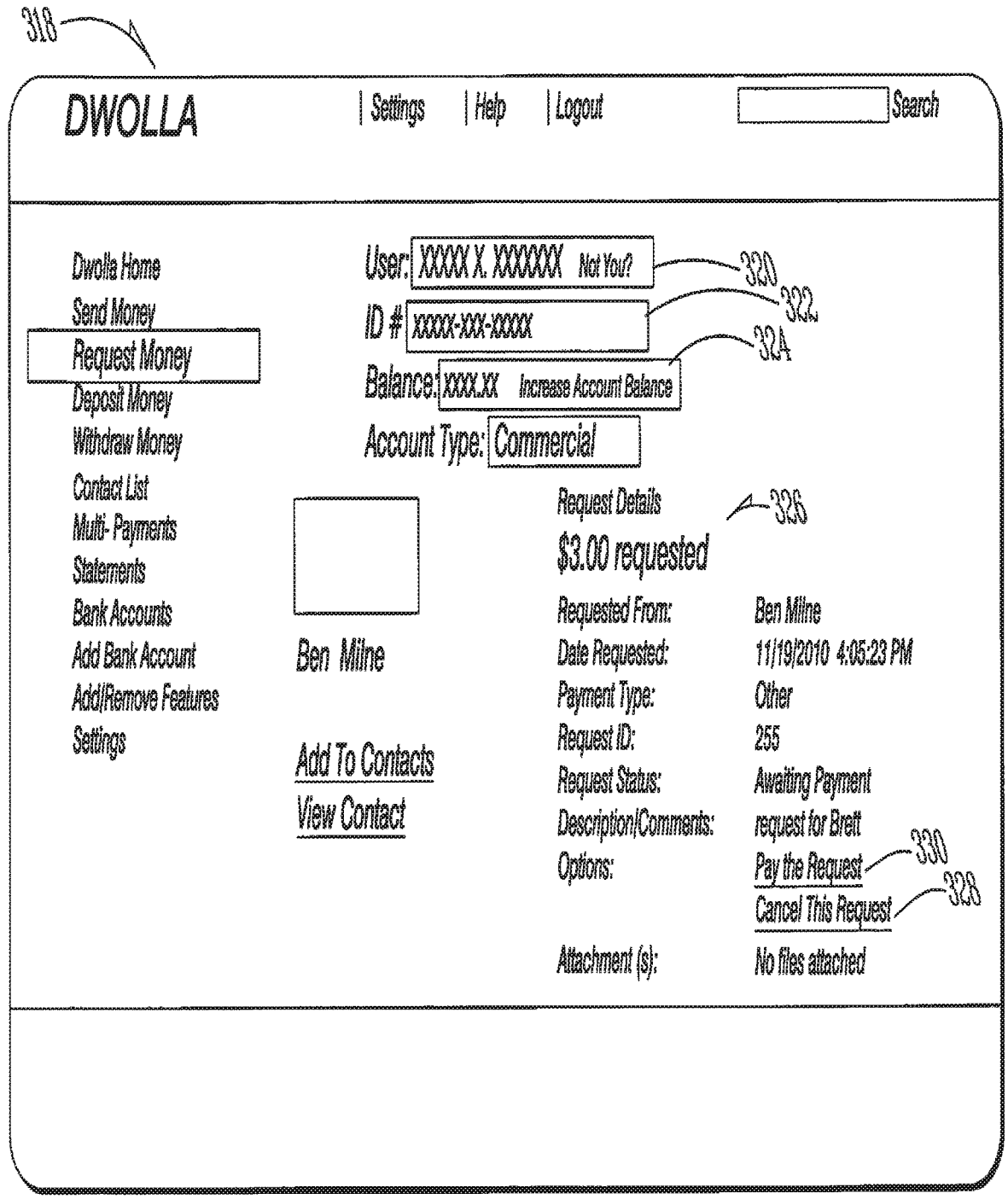
FIG. 14 illustrates an example display from an application running on an external system, the display showing a benefactor's funds request webpage in accordance with one embodiment.
Figure 15:
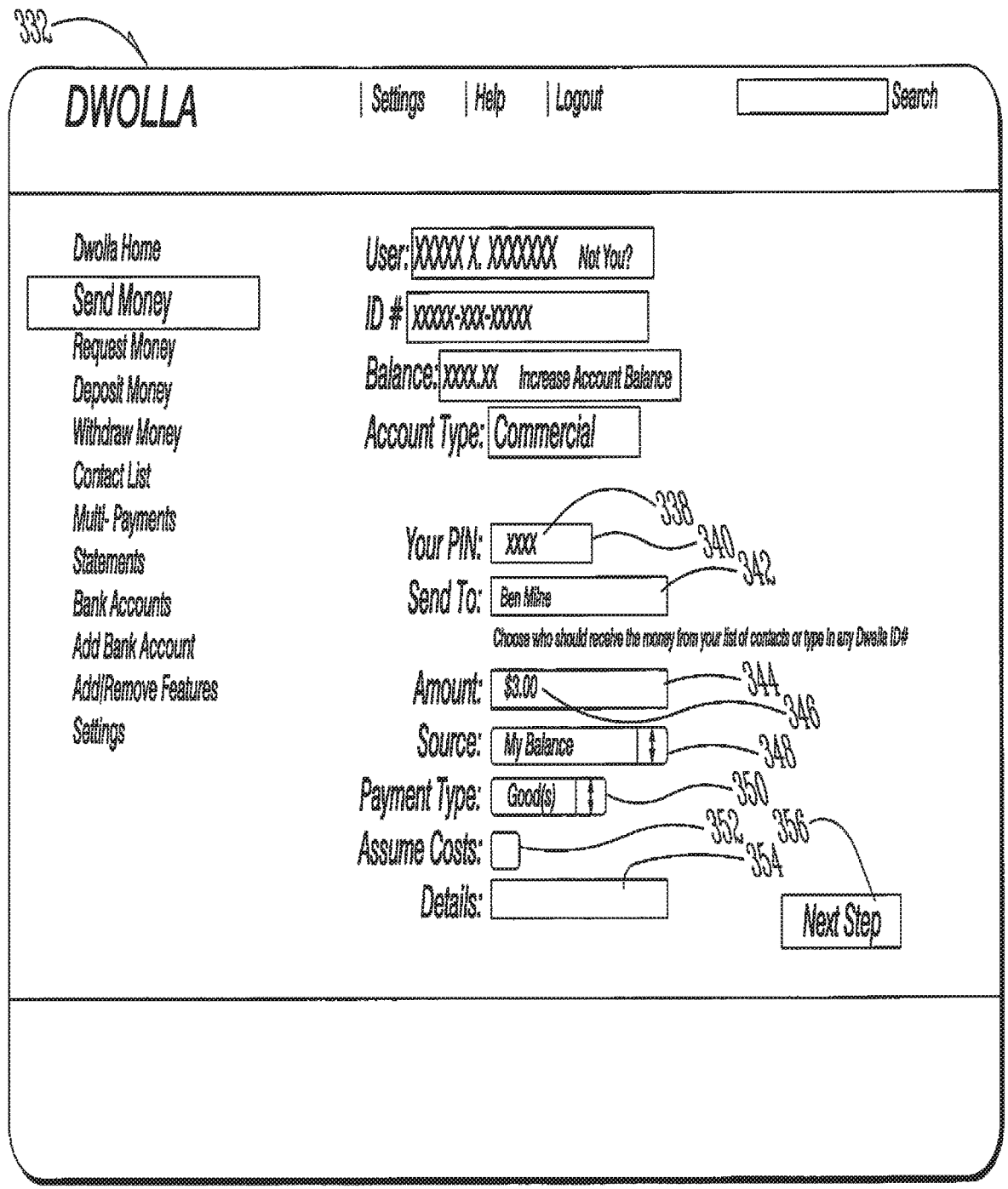
FIG. 15 illustrates an example display from an application running on an external system, the display showing a send money webpage in accordance with one embodiment.

As noted above, if the benefactor (298) has already created an account with the system (164), the benefactor (298) merely provides the user name and password into the appropriate fields and submits them to the system (164). If the benefactor (298) has not already created an account with the system (164), the benefactor (298) may select the social network authorization button (270) that sends an API request to the social network (114) to confirm the benefactor's identity and authorization to access the server (168) to provide funds to the user (102). Upon confirmation of the benefactor's authorization to access the server (168), the system (164) displays a benefactor's funds request webpage (318) (FIG. 14), listing the benefactor's name (320), account number (322), balance (324) and transaction history (326).

If the benefactor (298) does not wish to honor the fund request, the benefactor (298) may select the cancel request link (328), which removes the active request (330) from the benefactor's active request listings. If the benefactor (298) does wish to honor the fund request, the benefactor (298) selects the pay this request link (330), which causes the system (164) to display the send money webpage (332). (FIG. 16). If the benefactor (298) does not have a benefactor account (336) associated with the system (164), the benefactor (298) creates an account associated with the system in a manner described above, which will provide the benefactor with a benefactor pin number (338).

If the benefactor (298) does not have sufficient funds (334) in the benefactor account (336) associated with the system (164), the benefactor (298) may create a transfer funds into the benefactor account (336) by any known means, including but not limited to check, credit card, debit card, other ACH processing, gift card or physically delivered cash deposit. The benefactor (298) may also deposit funds into the benefactor account (336), in a manner such as that described above, from an external financial institution, which may be the same or different than the recipient's financial institution (282).

Once the benefactor (298) has sufficient funds (334) in the benefactor account (336) associated with the system (164), the benefactor (298) fills in the pin number field (340), the send to field (342) and an amount field (344). The system (164) may be configured to autofill in the amount field (344) with the amount (346) of funds requested by the user (102). The benefactor (298) also fills in a source field (348), a payment type field (350), an assumption of cost checkbox (352) and a details field (354).

Once the benefactor (298) has completed the fields (192), the user (102) selects the next step button (356). The benefactor (298) may then confirm the transfer in a manner such as that described above. Upon execution of the transfer, the system (164) debits the benefactor account (336) by the amount of the transfer and credits the user account (166) by the amount of the transfer. The system may also extract a transfer fee as described above.

Although the invention has been described with respect to a preferred embodiment thereof, it is to be understood that it is not to be so limited since changes and modifications can be made therein which are within the full, intended scope of this invention as defined by the appended claims.

What is claimed is:

1. A computer-implemented method comprising:
maintaining, by one or more computing devices implementing an online payment system, an account for a first party but not for a second party;
while the second party has no account with the online payment system, performing the steps of:
presenting, to the first party, one or more user interfaces that include first options for a plurality of distinct social network services supported by the online payment system;
receiving a selection of a first particular option identifying a particular social network service;
storing data indicating that the particular social network service is the social network service to which a second party belongs;
displaying, through the one or more user interfaces, selection options for a plurality of contacts of the first party within the selected social network service;
receiving request to transfer funds from the first party to the second party through a selection of a second particular option identifying the second party;
in the absence of information about any account of the second party that is to receive the funds, the one or more computing devices responding to the transfer request by making one or more API requests to an application programming interface of a social network service on which both the first party and the second party have accounts, and within which the first party has permission to send messages to the second party;
wherein the application programming interface is an application programming interface that the social network exposes to external third party applications;
wherein making the one or more API requests cause the social network service to send the second party, through the social network service, from a social network account of the first party, a message that includes a control that enables the second party to communicate directly with the online payment system, external to any messaging service provided by the social network service, wherein the control that enables the second party to communicate directly with the online payment system is a hyperlink which, when activated, requests a webpage from the online payment system;
receiving a communication, at the one or more computing devices, directly from the second party;
determining that the communication was generated in response to the second party using the control;
in response to the communication, the one or more computing devices sending one or more messages to the second party, wherein the one or more messages enable the second party to transfer the funds to a target account external to the online payment system.

2. The method of claim 1 wherein the message is indicated as having originated from a profile, maintained by the social network service, for the first party.

3. The method of claim 1 further comprising:
in response to receiving the transfer request, the online payment system performing the further steps of:
automatically creating a new recipient account for the second party using a name used by the second party in association with the social network service; and
crediting the new recipient account with an amount that is based on the transfer request.

4. The method of claim 1 wherein the one or more API requests authenticate the online payment system with the social network service using login information, for the social network service, of the first party.

5. The method of claim 1 further comprising:
the online payment system logging in to the social network service using login information, for the social network service, of the first party;
while logged in to the social network service as the first party, the online payment system obtaining information about contacts, of the first party, within the social network service; and
the online payment system using the information about contacts of the first party to assist the first party in designating to whom to transfer the funds.

6. The method of claim 1 wherein the one or more messages comprise an option which, when selected by the second party, causes the online payment system to send an API request to the social network system to cause the social network system to display a webpage, to the second party, for authorizing the fund transfer.

7. One or more non-transitory computer-readable media storing instructions which, when executed by one or more processors, cause performance of a method comprising:
maintaining, by one or more computing devices implementing an online payment system, an account for a first party but not for a second party;
while the second party has no account with the online payment system, performing the steps of:
presenting, to the first party, one or more user interfaces that include first options for a plurality of distinct social network services supported by the online payment system;
receiving a selection of a first particular option identifying a particular social network service;
storing data indicating that the particular social network service is the social network service to which a second party belongs;
displaying, through the one or more user interfaces, selection options for a plurality of contacts of the first party within the selected social network service;
receiving request to transfer funds from the first party to the second party through a selection of a second particular option identifying the second party;
in the absence of information about any account of the second party that is to receive the funds, the one or more computing devices responding to the transfer request by making one or more API requests to an application programming interface of a social network service on which both the first party and the second party have accounts, and within which the first party has permission to send messages to the second party;
wherein the application programming interface is an application programming interface that the social network exposes to external third party applications;
wherein making the one or more API requests cause the social network service to send the second party, through the social network service, from a social network account of the first party, a message that includes a control that enables the second party to communicate directly with the online payment system, external to any messaging service provided by the social network service, wherein the control that enables the second party to communicate directly with the online payment system is a hyperlink which, when activated, requests a webpage from the online payment system;
receiving a communication, at the one or more computing devices, directly from the second party;
determining that the communication was generated in response to the second party using the control;
in response to the communication, the one or more computing devices sending one or more messages to the second party, wherein the one or more messages enable the second party to transfer the funds to a target account external to the online payment system.

8. The one or more non-transitory computer-readable media of claim 7 wherein the message is indicated as having originated from a profile, maintained by the social network service, for the first party.

9. The one or more non-transitory computer-readable media of claim 7, wherein the method further comprises:
in response to receiving the transfer request, the online payment system performing the further steps of:
automatically creating a new recipient account for the second party using a name used by the second party in association with the social network service; and
crediting the new recipient account with an amount that is based on the transfer request.

10. The one or more non-transitory computer-readable media of claim 7 wherein the one or more API requests authenticate the online payment system with the social network service using login information, for the social network service, of the first party.

11. The one or more non-transitory computer-readable media of claim 7 wherein the method further comprises:
the online payment system logging in to the social network service using login information, for the social network service, of the first party;
while logged in to the social network service as the first party, the online payment system obtaining information about contacts, of the first party, within the social network service; and
the online payment system using the information about contacts of the first party to assist the first party in designating to whom to transfer the funds.

12. The one or more non-transitory computer-readable media of claim 7 wherein the one or more messages comprise an option which, when selected by the second party, causes the online payment system to send an API request to the social network system to cause the social network system to display a webpage, to the second party, for authorizing the fund transfer.

13. An online payment system comprising one or more computing devices configured to perform a method comprising:
maintaining an account for a first party but not for a second party;
while the second party has no account with the online payment system, performing the steps of:
presenting, to the first party, one or more user interfaces that include first options for a plurality of distinct social network services supported by the online payment system;
receiving a selection of a first particular option identifying a particular social network service;
storing data indicating that the particular social network service is the social network service to which a second party belongs;
displaying, through the one or more user interfaces, selection options for a plurality of contacts of the first party within the selected social network service;

receiving request to transfer funds from the first party to the second party through a selection of a second particular option identifying the second party;

in the absence of information about any account of the second party that is to receive the funds, responding to the transfer request by making one or more API requests to an application programming interface of a social network service on which both the first party and the second party have accounts, and within which the first party has permission to send messages to the second party;

wherein the application programming interface is an application programming interface that the social network exposes to external third party applications;

wherein making the one or more API requests cause the social network service to send the second party, through the social network service, from a social networking account of the first party, a message that includes a control that enables the second party to communicate directly with the online payment system, external to any messaging service provided by the social network service, wherein the control that enables the second party to communicate directly with the online payment system is a hyperlink which, when activated, requests a webpage from the online payment system;

receiving a communication directly from the second party;

determining that the communication was generated in response to the second party using the control in response to the communication, sending one or more messages to the second party, wherein the one or more messages enable the second party to transfer the funds to a target account external to the online payment system.

* * * * *